United States Patent
Patel et al.

(10) Patent No.: US 11,950,054 B2
(45) Date of Patent: Apr. 2, 2024

(54) MEMS CONDENSER MICROPHONE

(71) Applicant: AAC ACOUSTIC TECHNOLOGIES (SHENZHEN) CO., LTD., Shenzhen (CN)

(72) Inventors: Anup Patel, EB (GB); Euan James Boyd, EB (GB); Yannick Pierre Kervran, HK (FR)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 113 days.

(21) Appl. No.: 17/852,279

(22) Filed: Jun. 28, 2022

(65) Prior Publication Data

US 2023/0421969 A1 Dec. 28, 2023

(51) Int. Cl.
*H04R 19/04* (2006.01)
*H02N 13/00* (2006.01)

(52) U.S. Cl.
CPC ............. *H04R 19/04* (2013.01); *H02N 13/00* (2013.01); *H04R 2201/003* (2013.01)

(58) Field of Classification Search
CPC ................... H04R 2201/003; H04R 19/04
See application file for complete search history.

(56) References Cited

U.S. PATENT DOCUMENTS

2022/0194780 A1* 6/2022 Loeppert ............... B81B 3/0086

* cited by examiner

*Primary Examiner* — Sunita Joshi
(74) *Attorney, Agent, or Firm* — W&G Law Group

(57) ABSTRACT

Provided is a MEMS condenser microphone, including a base plate, a spacer and a membrane. The membrane is supported above the base plate by the spacer. The base plate, the spacer, and the membrane enclose a vacuum cavity. An end of the membrane close to the vacuum cavity is connected, by means of a connecting rod, to an electrostatic clutch. The electrostatic clutch is connected to a capacitive sensing structure. The microphone has the advantage of allowing microphone performance over a wide range of atmospheric pressures which is likely expected by customers. This is achieved electrostatically in a purely passive way which has an advantage over other designs which require complex electronics and active control. Physically decoupling the membrane and sense structure simplifies the design of the sense structure as only small AC perturbations of the rotor need to be considered with no DC changes in rotor position.

12 Claims, 11 Drawing Sheets

MEMS CONDENSER MICROPHONE

TECHNICAL FIELD

The present invention relates to the technical field of microphones, and particularly, to an MEMS condenser microphone.

BACKGROUND

All commercial MEMS microphones currently have a back volume behind the membrane. This is a semi-sealed volume of air that undergoes compression and expansion when there is an input acoustic wave. For a defined package size, this back volume is necessary to allow the membrane to move under external pressure wave. However, this back volume is currently the largest source of acoustic noise and hence biggest limiter for acoustic SNR in microphones. The smaller the back volume, the higher the acoustic noise from it. It is therefore impossible to realize a high SNR microphone above approximately 74 dB SNR unless the package size is made very large. If the back volume is replaced by a vacuum and the sensing part of the MEMS is included inside the vacuum, not only is the back volume noise effectively eliminated, but also damping noise related to membrane movement (e.g. back plate noise). The only way of achieving very high SNR in a normal or smaller sized package is to make the back volume a vacuum.

There are two significant challenges with such a type of vacuum back volume microphone: 1) the pressure difference of 1 atm between air and vacuum would collapse a normal membrane, therefore, a very stiff membrane is needed, and this causes very low sensitivity; 2) ambient pressure changes significantly resulting in a changeable DC offset of the membrane displacement, and conventional rotor-stator designs would not work.

Meanwhile, existing microphones require a back volume which is the biggest source of acoustic noise for a state of the art commercially available microphones. This limits SNR unless very large package sizes are used which is not feasible for mobile applications. It is not possible to achieve a very high microphone SNR, such as 80 dB, in a conventional package size unless a vacuum back volume is used.

The use of a vacuum or low pressure cavity hermetically sealed by a membrane which faces atmosphere, creates a fundamental measurement challenge. Atmospheric pressure varies depending on the environment the user and device are in by an order of 100 kPa. On top of this slow DC change in pressure, the device needs to measure an audio pressure signal of an order of 1 Pa.

One solution to this measurement challenge which concerns the present invention is to have a coupling between the atmosphere facing membrane and the rotor part of the sensing structure which is 'on' for AC audio signals and 'off' for low frequency or DC changes in atmospheric pressure. This clutch type coupling behavior can be realized through a frequency dependent electrostatic force. The electrostatic clutch in the present invention is designed to achieve a coupling force between the rotor and stator for AC sound pressure signals but not couple any force for slow 'DC' changes in atmospheric pressure which typically change the center deformation of the atmosphere facing membrane over a range of microns. For a DC pressure range, there should be zero or minimal stiffness between the rotor and stator, whilst the stiffness should be significant for AC audio pressures.

SUMMARY

A purpose of the present invention is to provide a MEMS condenser microphone, aiming to solve the technical problems in the related art, and allowing microphone performance over a wide range of atmospheric pressures which is likely expected by customers.

An embodiment of the present invention provides a MEMS condenser microphone, including a base plate, a spacer and a membrane. The membrane is supported above the base plate by the spacer, and the base plate, the spacer, and the membrane enclose a vacuum cavity; an end of the membrane close to the vacuum cavity is connected, by means of a connecting rod, to an electrostatic clutch; and the electrostatic clutch is connected to a capacitive sensing structure.

As an improvement, the electrostatic clutch includes: multiple arrays of high impedance nodes (HIN) electrodes, a respective pass-through channel being formed between any two arrays of the multiple arrays of HIN electrodes; and multiple arrays of biased electrodes, each array of the multiple arrays of biased electrodes moving back and forth in the respective pass-through channel, such that electrostatic force is generated between the multiple arrays of biased electrodes and the multiple arrays of HIN electrodes.

As an improvement, each array of the multiple arrays of HIN electrodes includes a plurality of HIN electrodes and a grounded part, an insulating silicon oxide layer is provided between adjacent HIN electrodes of the plurality of HIN electrodes, and the grounded part is electrically connected to the plurality of HIN electrodes and to ground.

As an improvement, each of the plurality of HIN electrodes includes a first conductive polysilicon layer, a resistive bridge layer, and a second conductive polysilicon layer; the first conductive polysilicon layer is electrically connected to the second conductive polysilicon layer through the resistive bridge layer; and the grounded part is electrically connected to the second conductive polysilicon layer of each of the plurality of HIN electrodes and to ground.

As an improvement, within each array of biased electrodes two adjacent biased electrodes of the plurality of biased electrodes have opposite polarities and are connected by an insulating mechanical support.

As an improvement, each array of biased electrodes further includes two grounded shielding electrodes, which are arranged at two ends of each array of the multiple arrays of biased electrodes.

As an improvement, the electrostatic clutch further includes: a first connecting part, and two second connecting parts symmetrically arranged at two opposite sides of the first connecting part; the first connecting part includes an end connected to the connecting rod, and another end connected to the multiple arrays of biased electrodes; each of the two second connecting parts includes an end connected to respective arrays of the multiple arrays of HIN electrodes, and another end connected to the capacitive sensing structure; the multiple arrays of HIN electrodes and the multiple arrays of biased electrodes are arranged in a comb-like configuration, and the multiple arrays of HIN electrodes and the multiple arrays of biased electrodes are spatially separated and cross each other; and the capacitive sensing structure includes a first lever, a first supporting part, a first sensing moving electrode, and a first sensing static electrode; a rod body of the first lever is pivotally connected to the first supporting part through a hinge; the first lever includes an end connected to the second connecting part, and another end connected to the first sensing moving electrode; and the first sensing static electrode is opposite to the first sensing moving electrode.

As an improvement, the electrostatic clutch further includes: a third connecting part, and two fourth connecting parts symmetrically arranged at two opposite sides of the first connecting part; the third connecting part includes an end connected to the connecting rod, and another end connected to the multiple arrays of biased electrodes; each of the two fourth connecting parts includes a first end and a second end. and the first end of one of the two fourth connecting parts is opposite to the first end of the other one of the two fourth connecting parts; the multiple arrays of HIN electrodes are connected to and arranged between the first ends of the two fourth connecting parts; and the second ends of the two fourth connecting parts are connected to the capacitive sensing structure; the multiple arrays of HIN electrodes and the multiple arrays of biased electrodes are arranged in a comb-like configuration, and the multiple arrays of HIN electrodes and the multiple arrays of biased electrodes are spatially separated and cross each other; and the capacitive sensing structure includes a second lever, a second supporting part, a bending slit, a second sensing moving electrode, and a second sensing static electrode; a rod body of the second lever is pivotally connected to the second supporting part through a hinge; the second lever includes an end connected to the fourth connecting part, and another end connected to the second sensing moving electrode; the second sensing static electrode is opposite to the second sensing moving electrode; and the bending slit is located close to an end of the second lever close to the fourth connecting part.

As an improvement, the electrostatic clutch further includes a fifth connecting part, a first suspension beam and a first suspension plate; the fifth connecting part includes an end connected to the connecting rod, and another end connected to the multiple arrays of HIN electrodes; two ends of the first suspension plate are suspended and supported in the vacuum cavity by means of the first suspension beam, the multiple arrays of biased electrodes are arranged on the first suspension plate and spaced from each other; first gaps and second gaps are formed in the first suspension plate at two opposite sides of the multiple arrays of biased electrodes; the multiple arrays of HIN electrodes one-to-one correspond to and extend into the first gaps; and the capacitive sensing structure includes third sensing static electrodes arranged on the base plate and spaced from each other, and the third sensing static electrodes one-to-one correspond to and extend into the second gaps.

As an improvement, each of the third sensing static electrodes includes a first portion and a second portion, the first portion extends into a respective one of the second gaps, and the second portion protrudes from the respective one of the second gaps to extend along a length direction of the first suspension plate.

As an improvement, the electrostatic clutch further includes a sixth connecting part, a second suspension beam, and a second suspension plate; the sixth connecting part includes an end connected to the connecting rod, and another end connected to the multiple arrays of biased electrodes; two ends of the second suspension plate are suspended and supported in the vacuum cavity by means of the second suspension beam, the multiple arrays of HIN electrodes are arranged on the second suspension plate and spaced from each other, and a respective one of third gaps is formed between any two adjacent arrays of the multiple arrays of HIN electrodes; the multiple arrays of biased electrodes one-to-one correspond to and extend into the third gaps; and the capacitive sensing structure includes fourth sensing moving electrodes and fourth sensing static electrodes, the fourth sensing moving electrodes are fixed to a bottom of the suspension plate, the fourth sensing static electrodes are arranged on the base plate and spaced from each other, and the fourth sensing static electrodes are opposite to the fourth sensing moving electrodes.

As an improvement, the electrostatic clutch includes a seventh connecting part, a third suspension beam and a third suspension plate; the seventh connecting part includes an end connected to the connecting rod, and another end connected to the multiple arrays of biased electrodes; two ends of the third suspension plate are suspended and supported in the vacuum cavity by means of the third suspension beam; the third suspension plate is provided with an accommodation cavity and the multiple arrays of HIN electrodes; the multiple arrays of HIN electrodes are arranged two opposite sides of the accommodation cavity; and a respective one of fourth gaps is formed between any two adjacent arrays of the multiple arrays of HIN electrodes; the multiple arrays of biased electrodes one-to-one correspond to and extend into the fourth gaps; and the capacitive sensing structure includes fifth sensing moving electrodes and fifth sensing static electrodes accommodated in the accommodation cavity; two ends of the fifth sensing moving electrodes are fixed to a wall surface of the accommodation cavity; the fourth sensing static electrodes are supported on the base plate by means of a support; the fourth sensing static electrodes and the fourth sensing moving electrodes are spatially separated and cross each other.

As an improvement, each array of biased electrodes is connected to the membrane, the membrane is disposed in the pass-through channel and moves back and forth along an arrangement direction of the biased electrodes in the respective pass-through channel.

As an improvement, the electrostatic clutch includes an eighth connecting part, a fourth suspension beam and a fourth suspension plate. The eighth connecting part includes an end connected to the connecting rod, and another end connected to arrays of high impedance nodes electrodes. Two sides of the fourth suspension plate are suspended and supported in the vacuum cavity through the fourth suspension beam, arrays of biased electrodes are arranged at the fourth suspension plate at intervals, and fifth gaps and a sixth gap are respectively formed at the fourth suspension plate at two opposite sides of the array of biased electrodes. The arrays of high impedance nodes electrodes are in one-to-one correspondence with the fifth gaps, and extend into the fifth gaps, respectively. The fifth gaps are evenly distributed at two opposite sides of the sixth gap. The sixth gap is provided therein with a light reflector, and the base plate is provided with a light emitter and a light detector.

Compared with the related art, the present invention has the advantage of allowing microphone performance over a wide range of atmospheric pressures which is likely expected by customers. This is achieved electrostatically in a purely passive way which has an advantage over other designs which require complex electronics and active control. Physically decoupling the membrane and sense structure simplifies the design of the sense structure as only small AC perturbations of the rotor need to be considered with no DC changes in rotor position.

REFERENCE NUMERALS

Figure 1:
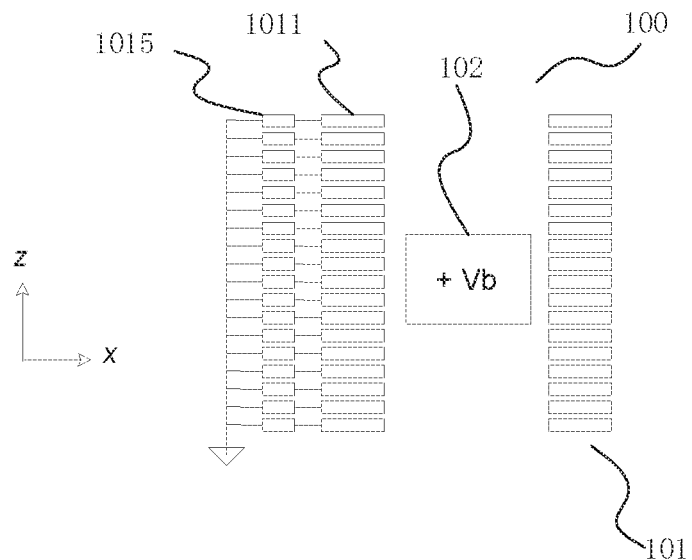
FIG. 1 is a schematic structural diagram of an electrostatic clutch consisting of a stator array of grounded HIN electrodes and a single biased rotor electrode.

100—electrostatic clutch;
101—an array of high impedance nodes electrodes;
1011—high impedance nodes electrode (HIN electrode);
1012—grounded part;
1013—insulating silicon oxide layer;
1014—first conductive polysilicon layer;
1015—resistive bridge layer;
1016—second conductive polysilicon layer;
1017—tuned resistance material;
1018—polysilicon conductive material;
102—an array of biased electrodes;
1021—biased electrodes;
1022—Insulating mechanical support;
1023—grounded shielding electrode;
103—first connecting part;
104—second connecting part;
105—third connecting part;
106—fourth connecting part;
107—fifth connecting part;
108—first suspension beam;
109—first suspension plate;
110—sixth connecting part;
111—second suspension beam;
112—second suspension plate;
113—seventh connecting part;
114—third suspension beam;
115—third suspension plate;
116—accommodation cavity;
117—eighth connecting part;
118—fourth suspension beam;
119—fourth suspension plate;
200—MEMS condenser microphone;
201—base plate;
202—spacer;
203—membrane;
204—vacuum cavity;
205—connecting rod;
300—capacitive sensing structure;
301—first lever;
302—first supporting part;
303—first sensing moving electrode;
304—first sensing static electrode;
305—second lever;
306—second supporting part;
307—bending slit;
308—second sensing moving electrode;
309—second sensing static electrode;
310—third sensing static electrode;
3101—first portion;
3102—second portion;
311—fourth sensing moving electrode;
312—fourth sensing static electrode;
313—fifth sensing moving electrode;
314—fifth sensing static electrode;
315—light reflector;
316—light emitter; and
317—light detector.

DESCRIPTION OF EMBODIMENTS

The following embodiments described herein with reference to the accompanying drawings are merely some examples, which are intended to better illustrate the present invention rather than make any limitation on the present invention.

In order to better illustrate the embodiments of the present invention, a three-dimensional coordinate system is made, where an XY plane refers to a plane parallel to a silicon die surface of a deposited MEMS layer, and a Z axis refers to an axis perpendicular to the XY plane.

As shown in FIGS. 1 to 5, an embodiment of the present invention provides an electrostatic clutch 100, which is configured to achieve a coupling force between the rotor and stator for AC sound pressure signals but not couple any force for slow 'DC' changes in atmospheric pressure which typically change the center deformation of the atmosphere facing membrane 203 over a range of microns. For a DC pressure range, there should be zero or minimal stiffness between the rotor and stator.

The electrostatic clutch 100 includes: at least two arrays 101 of high impedance nodes (HIN) electrodes, and an array 102 of biased electrodes.

The at least two arrays 101 of HIN electrodes are defined as a first component of the electrostatic clutch 100 and usually act as a clutch stator, and a pass-through channel is formed between two arrays 101 of HIN electrodes. In this embodiment, preferably, each array 101 of high impedance nodes electrode includes a plurality of HIN electrodes 1011 and a grounded part 1012. The large the number of HIN electrodes 1011, the higher the performance. However, for embodiments with z-axis rotor displacement, the number of HIN electrodes 1011 is limited by process constraints. An insulating silicon oxide layer 1013 is provided between two adjacent HIN electrodes 1011, and a grounded part 1012 is electrically connected to ground while the grounded part 1012 is electrically connected to a plurality of HIN electrodes 1011.

The array 102 of biased electrodes are defined as a second component of the electrostatic clutch 100 and usually serves as a clutch rotor. Those skilled in the art should know that, it is also possible that the at least two arrays 101 of HIN electrodes act as a clutch rotor, while the array 102 of biased electrodes acts as a clutch stator, and this is not limited herein. An end of the array 102 of biased electrodes is connected to the membrane 203, and with movement of the membrane 203, another end of the array 102 of biased electrodes can move back and forth in the pass-through channel under an electrostatic force between the array 102 of biased electrodes and the at least two arrays 101 of high impedances electrodes. The electrostatic force obeys a Hooke's law type behavior for small displacements of the rotor resulting from charges drawn into the HIN electrodes from ground, and trapped there due to the resistive bridges.

The electrostatic clutch 100 is effectively "on" for audio band frequencies and "off" for low frequencies. This clutch acts as an RC high pass filter which couples the AC movement of the membrane corresponding to an audio signal but filters the slow movement of the membrane due to slow changes in atmospheric pressure typically over the range 0.5-1 atm which could occur, for example, with changes in weather, altitude or inside a passenger aircraft.

When the array 102 of biased electrodes is not moving or moving at a frequency lower than the cut off frequency, charges flow freely from and onto the surface of the HIN electrodes 1011. This means when the array 102 of biased electrodes move slowly relative to the array 101 of HIN electrodes, at a frequency lower than the cut-off, there is no force coupling or interaction between the clutch stator and rotor. In this case the coupling stiffness or clutch stiffness is approximately zero. However, when the clutch rotor moves at a frequency higher than cut-off, the charges induced in the HINs due to the biased electrodes 1021 are trapped. Typically, the dimensions of each HIN will be much smaller than the biased electrodes resulting is a significant restoring force for AC displacement of the clutch rotor. This corresponds to a significant coupling stiffness. The filter is therefore achieved by frequency dependent electrostatic stiffness between the atmosphere facing membrane 203 and the rotor part of the capacitive sensing structure 300.

Figure 2:
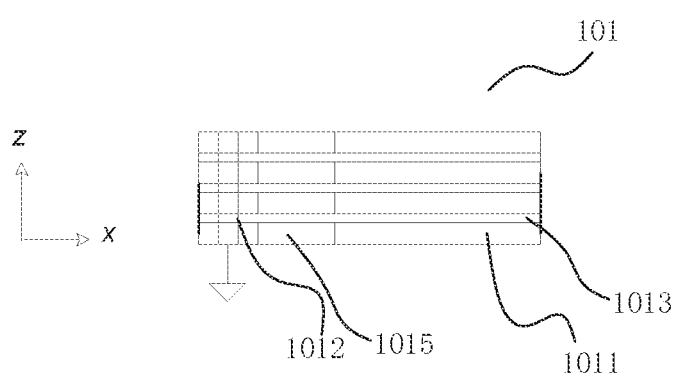
FIG. 2 is illustration of how layers deposited as thin films using standard silicon processes can form an HIN array.
Figure 3:
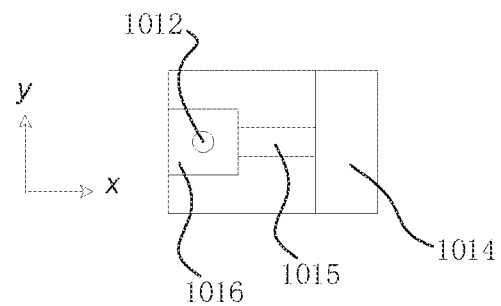
FIG. 3 is a top view of an electrical connection for a layer in an thin film array of high impedance nodes electrodes.

With reference to FIG. 2 and FIG. 3, the high impedance nodes electrode 1011 includes a first conductive polysilicon layer 1014, a resistive bridge layer 1015 and a second conductive polysilicon layer 1016. The first conductive polysilicon layer 1014 is electrically connected to the second polysilicon layer 1016 through the resistive bridge layer 1015, and the grounded part 1012 is electrically connected to the second conductive polysilicon layer 1016 while the grounded part 1012 is electrically connected to ground. The material of the resistive bridge layer 1015 connecting each layer to ground may be doped polysilicon, materials used to create diodes and or a shottky material. The resistivity of this material and the resistive bridge layer 1015 can be used to tune the roll-off frequency which determines the frequency below which the clutch is no longer actuating the sensing part of the transducer. This is because the roll off frequency is expected to be proportional to 1/RC where R is the resistance of the resistive bridge layer 1015 and C is the capacitance between a single HIN element 1011 and the biased electrode it faces.

Figure 15:
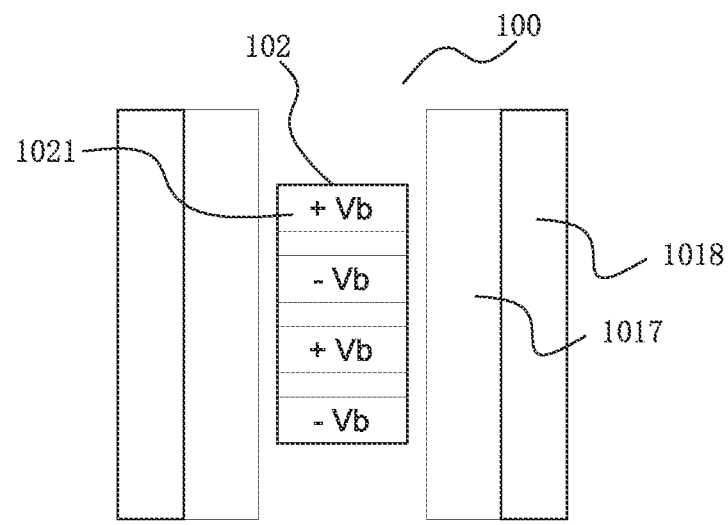
FIG. 15 is another schematic structural diagram of an array of high impedance nodes electrodes.

As shown in FIG. 15, the array 101 of HIN electrodes can also be formed by a tuned resistance material 1017 and a polysilicon conductive material 1018, and the polysilicon conductive material 1018 is connected to ground, this has the major advantage of avoiding many process layers. Instead of the resistance of individual resistive bridge layer determining roll off frequency, as for the array 101 of HIN electrodes, in this case the resistivity of the tuned resistance material 1017 will determine the frequencies over which charge is locally trapped when the array 102 of biased electrodes moves. The connection to ground for this material can provided by a layer of polysilicon or other conductive material with a resistivity less than that of the tuned resistance material 1017. The polysilicon conductive layer 1018 has an interface with the tuned resistance material 1017 in the z-axis, and has the purpose of achieving zero potential along the z axis length of the tuned resistance material 1017 on the surface not facing the biased electrode(s). Additional advantages of this embodiment include the elimination of insulating layers which have the effect of reducing the clutch z-axis stiffness.

Figure 4:
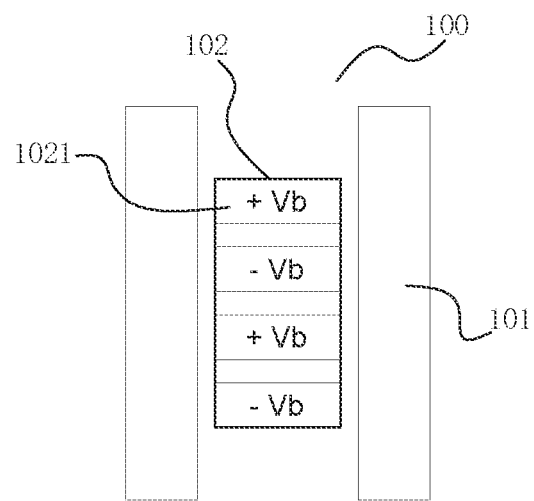
FIG. 4 is an embodiment of the electrostatic clutch in a case that a plurality of biased electrodes are provided with alternating polarity.
Figure 5:
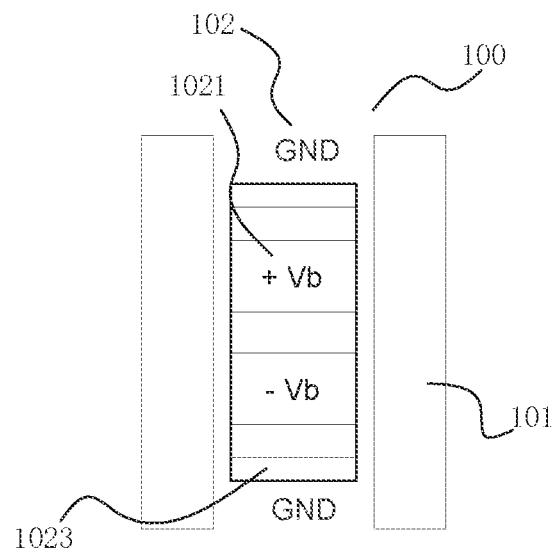
FIG. 5 is an embodiment of the electrostatic clutch in a case that grounded shielding electrodes are provided at the ends of the biased electrode array to enhance stiffness.

As shown in FIG. 4 and FIG. 5, the array 102 of biased electrodes includes a plurality of biased electrodes 1021, and the plurality of biased electrodes 1021 are arranged based on alternate polarities of the plurality of biased electrodes 1021. Two adjacent biased electrodes 1021 have different polarities, and an insulating mechanical support 1022 is provided between two adjacent biased electrodes 1021. The array 102 of biased electrodes further includes grounded shielding electrodes 1023, and a respective grounded shielding electrode 1023 is provided at each of a top and a bottom of the array 102 of biased electrodes. Their purpose is to minimize electric field from the biased electrodes 1021 from leaving the pass-through channel between arrays 101 of HIN electrodes. Stray electric field is the origin of non-zero DC force between the clutch rotor and stator over its range of DC displacement. A non-zero DC force actuates the sensing part of the transducer when there is no audio signal which is not wanted. The grounded shielding electrode 1023 effectively reduce the DC force to almost zero over a large distance range of microns expected for atmospheric pressure changes.

Based on the above-mentioned electrostatic clutch 100, an embodiment of the present invention further provides a MEMS condenser microphone 200, including a base plate 201, a spacer 202 and a membrane 203. The membrane 203 is supported above the base plate 201 by the spacer 202. The base plate 201, the spacer 202, and the membrane 203 encloses a vacuum cavity 204. An end of the membrane 203 close to the vacuum cavity 204 is connected to the electrostatic clutch 100 by a connecting rod 205. The electrostatic clutch 100 connected to a capacitive sensing structure 300.

The base plate 201 may be made of monocrystalline silicon or other materials known to those skilled in the art. The spacer 202 and the membrane 203 that is supported above the base plate 201 by the spacer 202 may be formed by layer-by-layer deposition, patterning, and sacrifice processes. If necessary, an insulating layer may be provided between the spacer 202 and the base plate 201, and this case will not be further described herein.

The vacuum cavity 204, for example, can be sealed by low-pressure plasma-enhanced chemical vapor deposition (PECVD) at 200-350° C. This MEMS process belongs to common knowledge in the technical field, and is therefore not further described herein. The pressure of the vacuum cavity 204 is preferably lower than 1 kPa, so that the viscosity of the residual gas in the vacuum cavity 204 is significantly lower than the viscosity of a standard atmospheric pressure.

Being a vacuum cavity 204, a pressure of which is lower than the atmospheric pressure is formed between the membrane 203 and the base plate 201, the membrane 203 undergoes static deformation under an action of the atmospheric pressure in a case without an acoustic pressure. That is, the membrane 203 undergoes a static deformation towards the base plate 201, charges flow freely from and onto the surface of the HIN electrodes 1011. This means when the array 102 of biased electrodes moves slowly relative to the array 101 of HIN electrodes, at a frequency lower than the cut-off, there is no force coupling or interaction between the clutch stator and clutch rotor, and an electrical signal outputted from the capacitive structure in the capacitive sensing structure 300 does not change. When the membrane deforms at a frequency higher than cut-off, the electrostatic clutch 100 generates an electrostatic coupling force, to drive the capacitive structure to output variable electrical signals.

The present invention provides various structures of a MEMS compact microphone 200, and it can be known that those skilled in the art can obtain more variant embodiments based on the structures of the microphone provided by the embodiments of the present invention, which will not be limited herein.

As shown in FIG. 6A, FIG. 6B, FIG. 6C, FIG. 6D and FIG. 7, which illustrate a first structure of a MEMS compact microphone 200 according to the present invention, the electrostatic clutch 100 and the capacitive sensing structure 300 are disposed in the vacuum cavity 204, and the electrostatic clutch 100 further includes a first connecting part 103 and a second connecting part 104. The first connecting parting part 103 includes an end connected to a connecting rod 205, and another end connected to multiple arrays 102 of biased electrodes, which act as a rotor of the electrostatic clutch 100. The deformation of the membrane 203 will cause the multiple arrays 102 of biased electrodes to move synchronously with deformation of the membrane 203.

Two second connecting parts 104 are provided at two opposite sides of the first connecting part 103. Each of the two second connecting parts 104 includes an end connected to multiple arrays 101 of HIN electrodes, and another end connected to the capacitive sensing structure 300. The multiple arrays 101 of HIN electrodes act as a stator of the electrostatic clutch 100.

The multiple arrays 101 of HIN electrodes and the multiple arrays 102 of biased electrodes are arranged in a comb-like configuration. The multiple arrays 101 of HIN electrodes and the multiple arrays 102 of biased electrodes are separated spatially, and the multiple arrays 101 of HIN electrodes and the multiple arrays 102 of biased electrodes cross each other. Such a structure can achieve a relatively large displacement, reduce acoustic noise, and provide high stiffness.

The capacitive sensing structure 300 includes a first lever 301, a first supporting part 302, a first sensing moving electrode 303, and a first sensing static electrode 304. A rod body of the first lever 301 is pivotally connected to the first supporting part 302 through a hinge. The first lever 301 includes an end connected to the second connecting part 104, and another end connected to the first sensing moving electrode 303. The first sensing static electrode 304 is opposite to the first sensing moving electrode 303, and the first sensing static electrode 304 and the first sensing moving electrode 303 constitute a capacitor structure that can output variable electrical signals.

When the membrane 203 vibrates, the electrostatic clutch 100 is activated to generate a coupling electrostatic force, and the clutch stator displaces due to AC displacement of the clutch rotor, so that an end of the first lever 301 is activated, with the first lever 301 increasing the mechanical sensitivity by amplifying the displacement of the electrostatic clutch 100. The first sensing moving electrode 303 connected to the first lever 301 moves synchronously, thus, a facing area between the first sensing static electrode 304 and the first sensing moving electrode 303 changes, so that the capacitor structure can output variable electrical signals. A working principle of the capacitor structure is known to those skilled in the art.

Figure 6A:
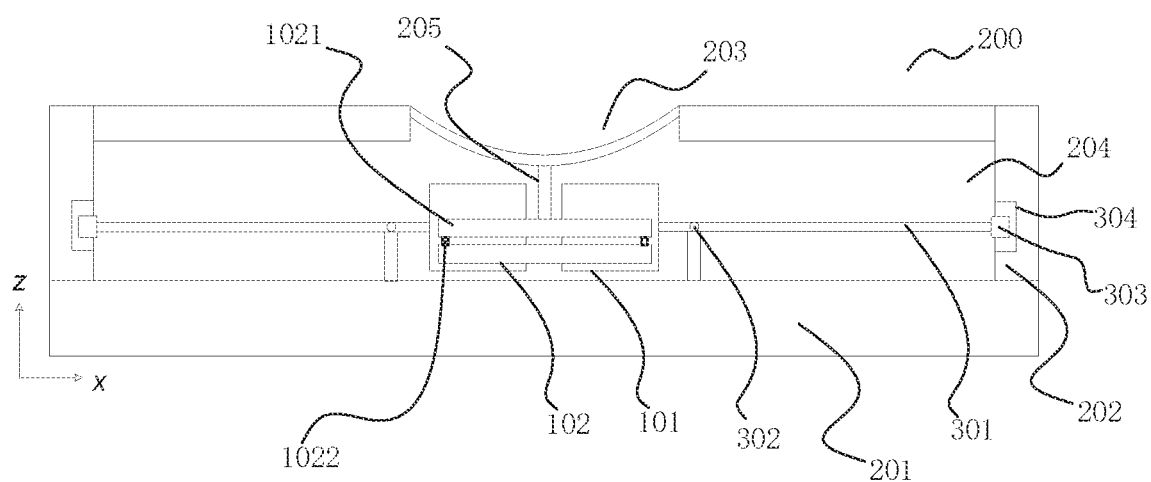
FIGS. 6A, 6B, 6C and 6D are schematic structural diagrams of a first structure of a MEMS condenser microphone according to the present invention, illustrating embodiments of the invention where an electrostatic clutch is part of a hinged cantilever transducer with varying combinations of atmospheric and acoustic pressure
Figure 6B:
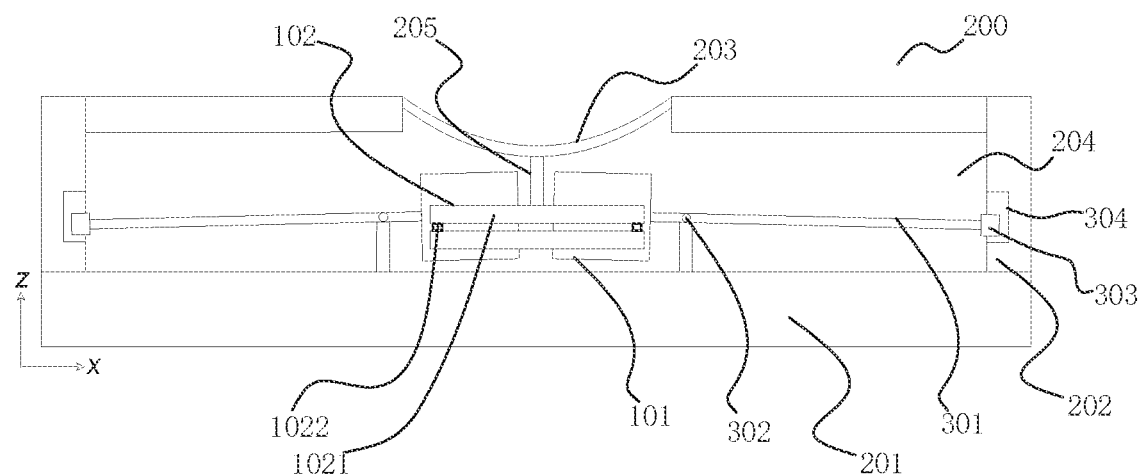
Figure 6C:
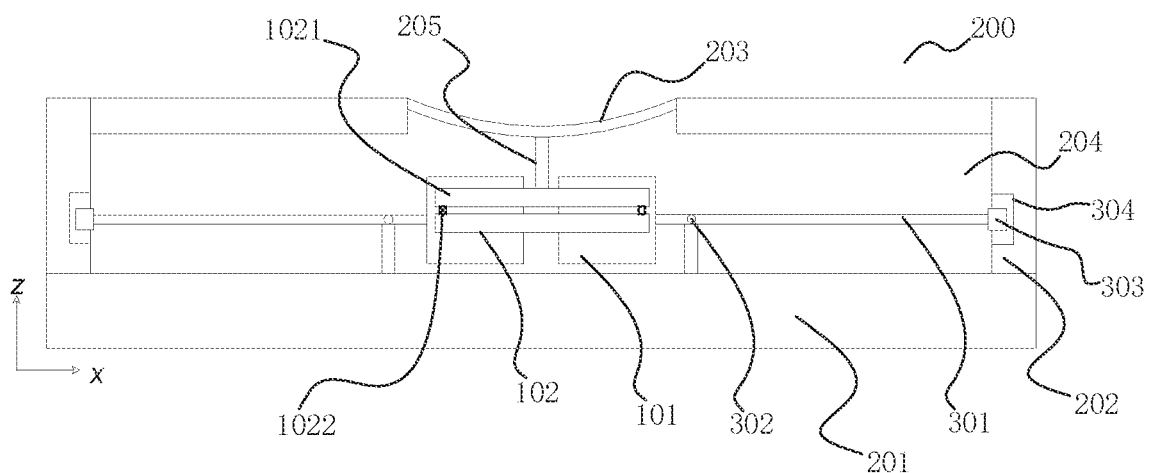
Figure 6D:
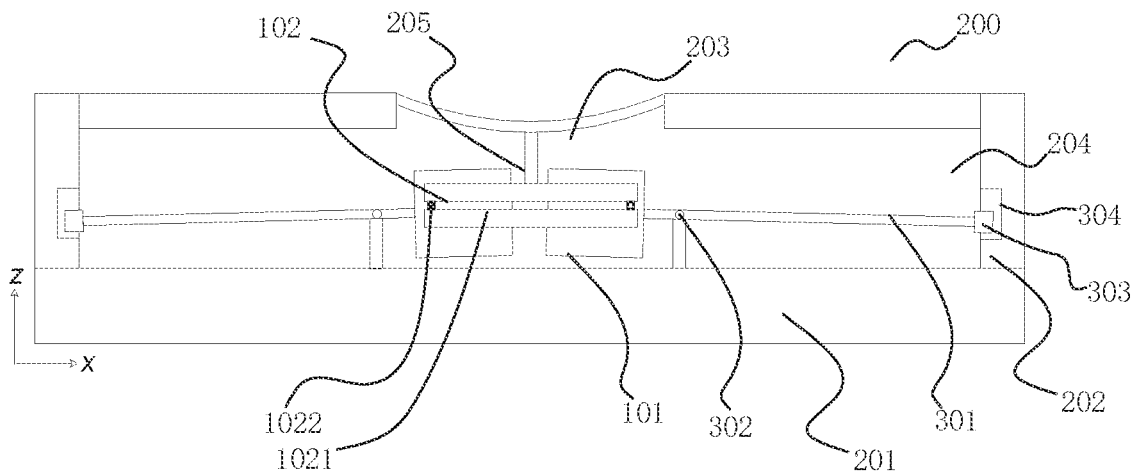
Figure 7:
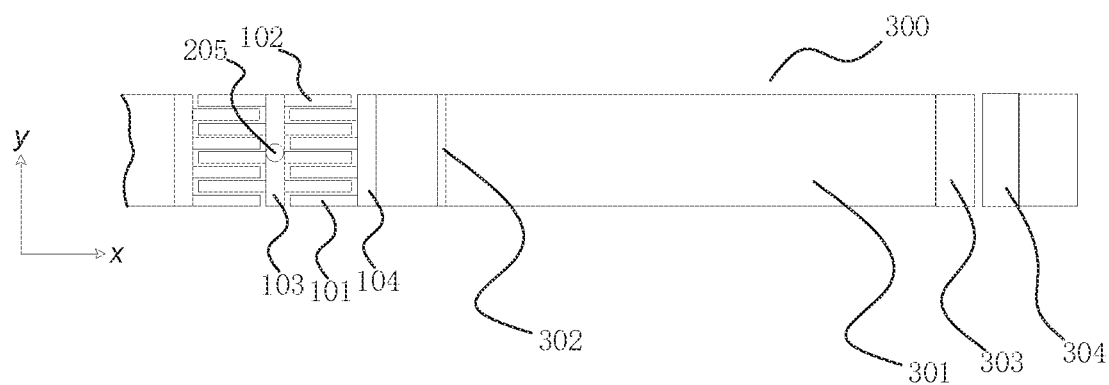
FIG. 7 is a top view of the first structure of a MEMS condenser microphone according to the present invention.

The differences between FIG. 6A, FIG. 6B, FIG. 6C and FIG. 6D illustrate the working principle of the invention. In FIG. 6A, there is a relatively high DC atmospheric pressure and no AC acoustic pressure, leading to a relatively low position of the electrostatic clutch rotor 102 and no displacement of the sensing electrode 303. For an acoustic pressure signal with the same atmospheric pressure as in FIG. 6A, FIG. 6B show the displacements when at the low pressure part of the AC acoustic signal. In this case the electrostatic clutch is active resulting in a displacement of the sense electrode 303 and therefore a signal being generated. FIG. 6C shows the alternative situation with a relatively low DC atmospheric pressure leading to a relatively high position of the electrostatic clutch rotor 102, however because the electrostatic clutch is inactive, the position of the sense electrode 303 is the same as in FIG. 6A. When an AC acoustic pressure is applied the movement of the sense electrode and signal generated is the same as in FIG. 6B. This ability to only measure AC acoustic pressure and not DC atmospheric pressure, allows the sense geometry to be simple and optimized for high sensitivity.

Figure 8A:
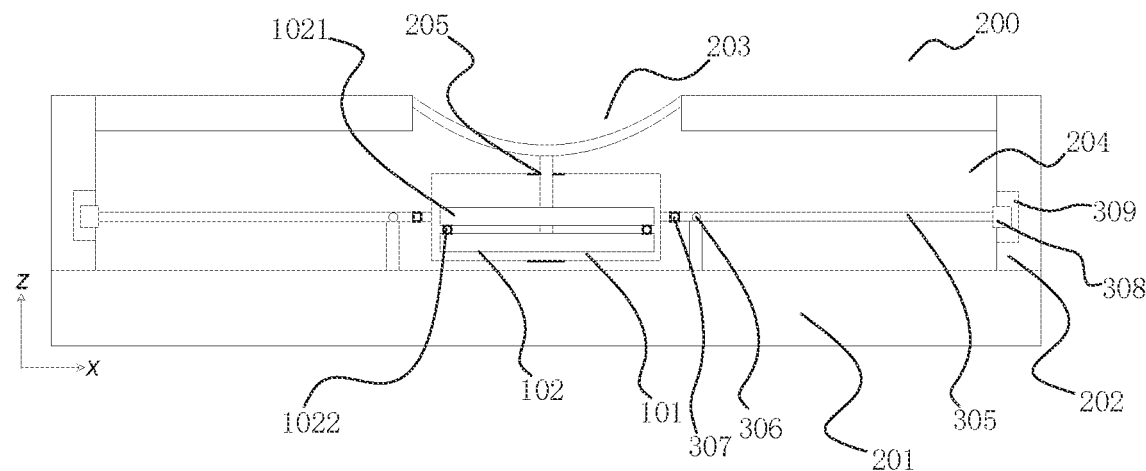
FIG. 8A and FIG. 8B are schematic structural diagrams of a second structure of a MEMS condenser microphone according to the present invention.
Figure 8B:
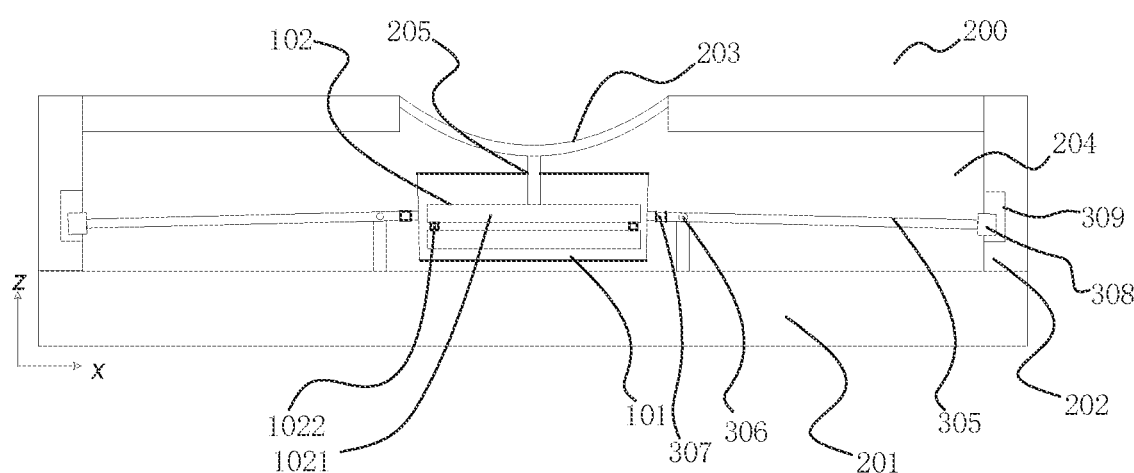
Figure 9:
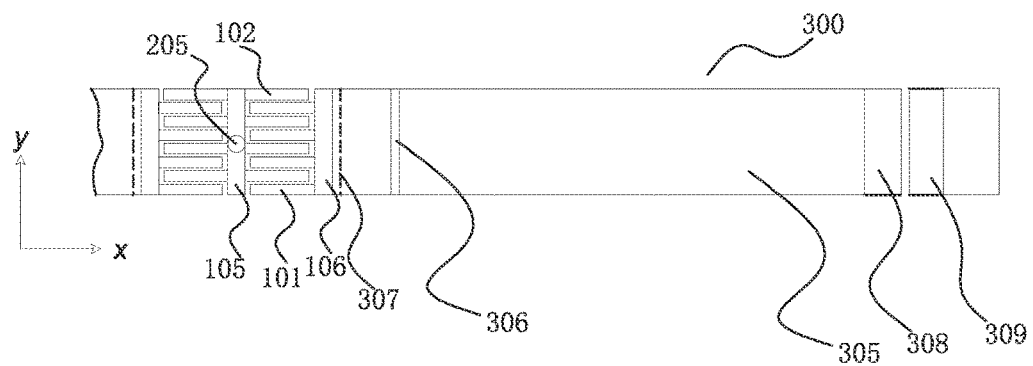
FIG. 9 is a top view of the second structure of a MEMS condenser microphone according to the present invention.

FIG. 8A, FIG. 8B and FIG. 9 show an embodiment of the invention that is similar to that shown in FIG. 6A. The main difference is that the multiple arrays of HIN electrodes 101 are joined together in the x-axis direction so that the lever 305 on either side of the membrane are mechanically connected. To allow for the lever 305 to bend around the hinge on support 306, there needs to be a bending slit 307. This embodiment of the invention ensures that the multiple arrays of HIN electrodes 101 and biased electrodes 102 are well aligned for the full range of atmospheric pressures, without suffering changes in electrostatic clutch stiffness for different atmospheric pressures. FIG. 8B illustrates the mechanical displacements in the embodiment for an AC acoustic pressure.

The capacitive sensing structure 300 includes a second lever 305, a second supporting part 306, a bending slit 307, a second sensing moving electrode 308, and a second sensing static electrode 309. A rod body of the second lever 305 is pivotally connected to the second supporting part 306 through a hinge. The second lever 305 includes an end connected to the fourth connecting part 106, and another end connected to the second sensing moving electrode 308. The second sensing static electrode 309 is opposite to the second sensing moving electrode 308, and the second sensing static electrode 309 and the second sensing moving electrode 308 constitute a capacitor structure that can output variable electrical signals. The bending slit 307 is provided at an end of the second lever 305 close to the fourth connecting part 106. In this case, the clutch stator displaces only in the z-axis and will not rotate, and the lever is activated through the bending slit 307. The second sensing moving electrode 308 connected to the second lever 305 moves synchronously, thus, a facing area between the second sensing static electrode 309 and the second sensing moving electrode 308 changes, so that the capacitor structure can output variable electrical signals. A working principle of the capacitor structure is known to those skilled in the art.

Figure 10:
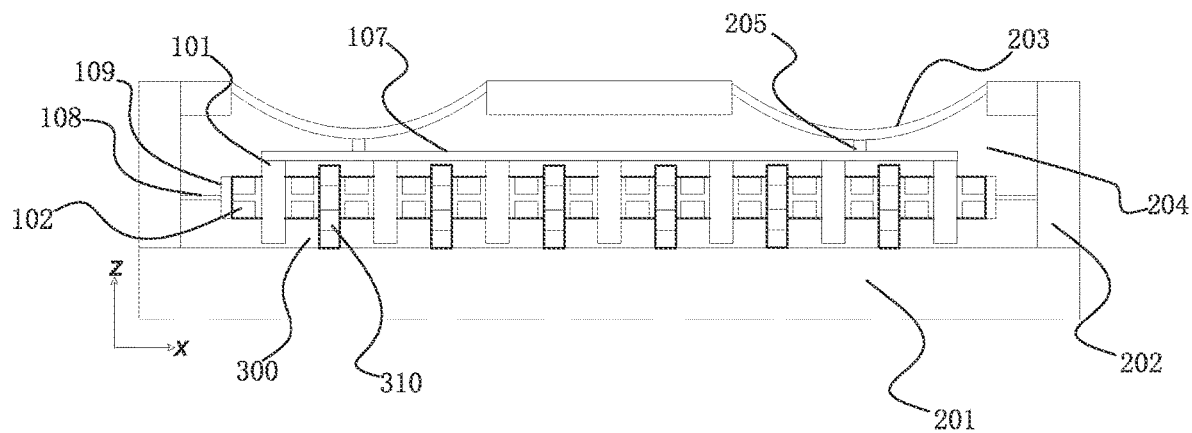
FIG. 10 is a schematic structural diagram of a third structure of a MEMS condenser microphone according to the present invention.
Figure 11:
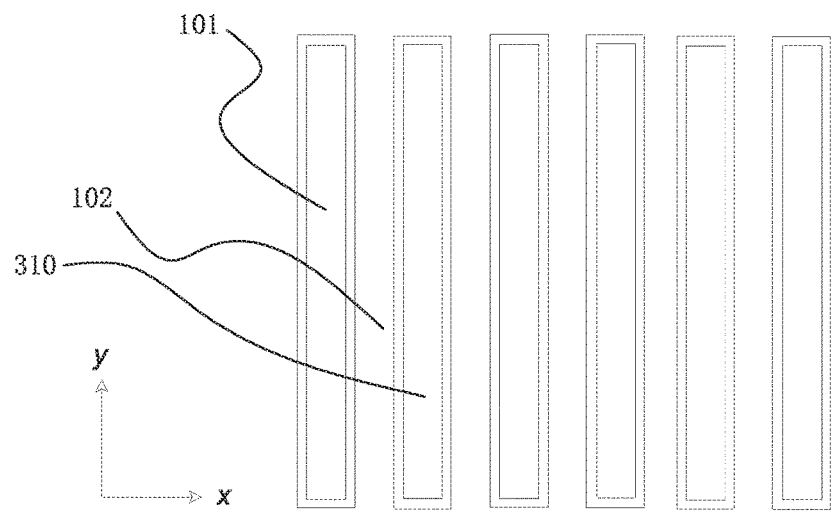
FIG. 11 is a top view of the third structure of a MEMS condenser microphone according to the present invention.

As shown in FIG. 10 and FIG. 11, which illustrate a third structure of a MEMS compact microphone 200 according to the present invention, the electrostatic clutch 100 includes a fifth connecting part 107, a first suspension beam 108, and a first suspension plate 109. The fifth connecting part 107 includes an end connected to a connecting rod 205, and another end connected to multiple arrays 101 of HIN electrodes, which act as a rotor of the electrostatic clutch 100. The deformation of the membrane 203 will cause the multiple arrays 101 of HIN electrodes to move synchronously with deformation of the membrane 203.

Each of two ends of the first suspension plate 109 is suspended and supported in the vacuum cavity 204 by means of the first suspension beam 108, and multiple arrays 102 of biased electrodes are arranged on the first suspension plates 109 and spaced from each other. First gaps and second gaps are formed in the first suspension plate 109 at two opposite sides of the arrays 102 of biased electrodes are formed with, and the biased electrodes 1021 constitute a stator of the electrostatic clutch 100 and a sensing moving electrode of the capacitive sensing structure 300.

The arrays 101 of HIN electrodes one-to-one correspond to and extend into the first gaps.

The capacitive sensing structure 300 includes third sensing static electrodes 310, which are arranged on the base plate 201 and spaced from each other. The third sensing static electrodes 310 one-to-one correspond to and extend into the second gaps.

When the membrane 203 vibrates, the electrostatic clutch 100 is activated to generate an electrostatic force, and the clutch stator displaces due to AC displacement of the clutch rotor, thus a facing area between the third sensing static electrode 310 and the biased electrodes 1021 changes, so that the capacitor structure can output variable electrical signals. A working principle of the capacitor structure is known to those skilled in the art.

The embodiment in FIG. 10, shows two HIN static sense electrodes arranged in the z-axis, separated by a spacer, which allows for differential sensing when the pairs of biased electrodes 102 move in the z-axis. The pairs of biased electrodes can have opposite polarity and have the advantage in this embodiment of simultaneously acting as the stator part of the electrostatic clutch and the rotor part of the sensing capacitor, allowing more efficient use of the cavity 204, and higher sense capacitance.

Figure 12:
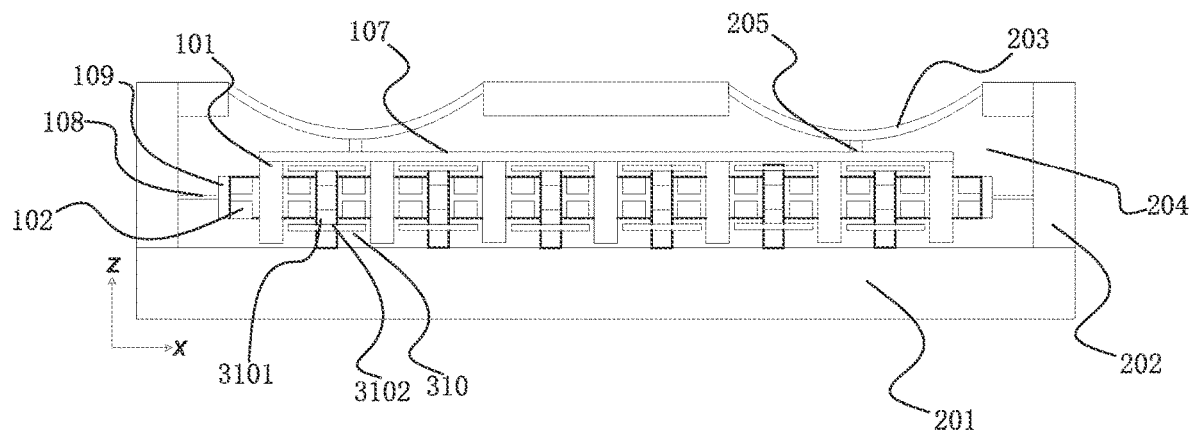
FIG. 12 is a schematic structural diagram of a fourth structure of a MEMS condenser microphone according to the present invention.

As shown in FIG. 12, which illustrate a fourth structure of a MEMS compact microphone 200 according to the present invention, the third structure of the MEMS condenser microphone 200 differs from the third structure of the MEMS condenser microphone 200 in that, the third sensing static electrode 310 includes a first portion 3101 and a second portion 3102, the first portion 3101 extends into the second gap, and the second portion 3102 protrudes from the second gap to extend along a length direction of the first suspension plate 109. The second portion 3102 is a parallel plate structure, and this has the purpose of maximizing sense capacitance or allowing for higher sensitivity.

Figure 13:
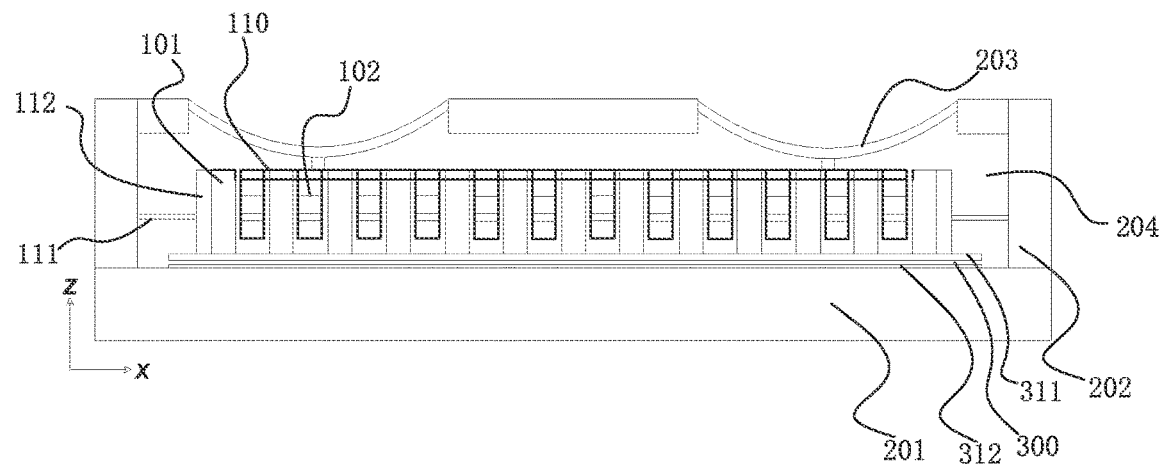
FIG. 13 is a schematic structural diagram of a fifth structure of a MEMS condenser microphone according to the present invention.

As shown in FIG. 13, which illustrate a fifth structure of a MEMS compact microphone 200 according to the present invention, the electrostatic clutch 100 includes a sixth connecting part 110, a second suspension beam 111 and a second suspension plate 112. The sixth connecting part 110 includes an end connected to a connecting rod 205, and another end connected to multiple arrays 102 of biased electrodes, which act as a rotor of the electrostatic clutch 100. The deformation of the membrane 203 will cause the multiple arrays 102 of biased electrodes to move synchronously with deformation of the membrane 203.

Each of two ends of the second suspension plate 112 is suspended and supported in the vacuum cavity 204 by means of the second suspension beam 111, and multiple arrays 101 of HIN electrodes are arranged on the second suspension plates 112 and spaced from each other. A third gap is formed between adjacent arrays 101 of HIN electrodes, and multiple arrays 101 of HIN electrodes constitute a stator of the electrostatic clutch 100.

Multiple arrays 102 of biased electrodes one-to-one correspond to and extend into the third gaps.

The capacitive sensing structure 300 includes fourth sensing moving electrodes 311 and fourth sensing static electrodes 312 in a parallel plate convention. The fourth sensing moving electrodes 311 are fixed to a bottom of the suspension plate, and the fourth sensing static electrodes 312 are arranged on the base plate 201 and spaced from each other. The fourth sensing static electrodes 312 are opposite to the fourth sensing moving electrodes 311 to form a capacitor structure, and a capacitance value changes by adjusting a distance between the fourth sensing static electrode 312 and the fourth sensing moving electrode 311.

When the membrane 203 vibrates, the electrostatic clutch 100 is activated to generate an electrostatic force, and the clutch stator displaces due to AC displacement of the clutch rotor, thus a distance between the fourth sensing moving electrode 311 and the fourth sensing static electrode 312 changes, so that the capacitor structure can output variable electrical signals. A working principle of the capacitor structure is known to those skilled in the art.

Figure 14:
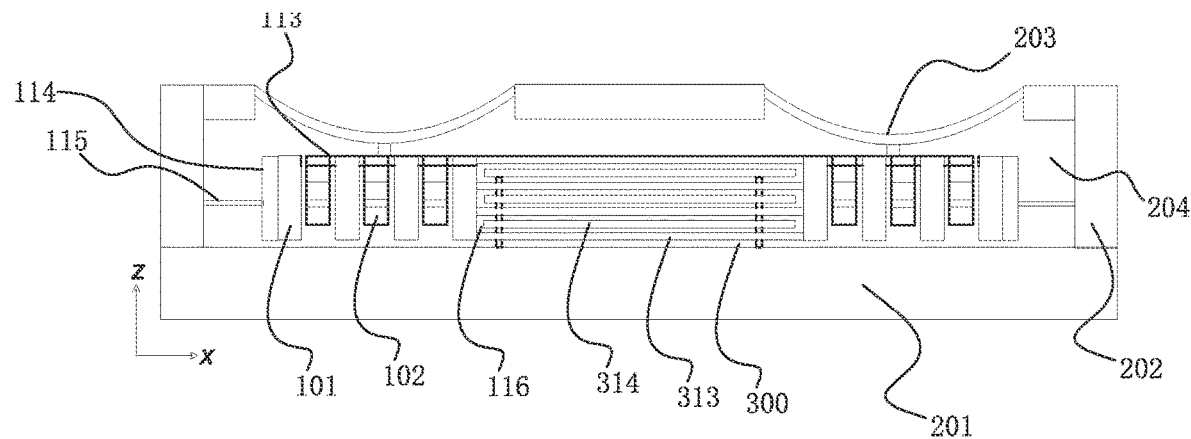
FIG. 14 is a schematic structural diagram of a sixth structure of a MEMS condenser microphone according to the present invention.

As shown in FIG. 14, which illustrate a sixth structure of a MEMS compact microphone 200 according to the present invention, the electrostatic clutch 100 includes a seventh connecting part 113, a third suspension beam 114 and a third suspension plate 115. The seventh connecting part 113 includes an end connected to a connecting rod 205, and another end connected to multiple arrays 102 of biased electrodes, which act as a rotor of the electrostatic clutch 100. The deformation of the membrane 203 will cause the multiple arrays 102 of biased electrodes to move synchronously with deformation of the membrane 203.

Each of two ends of the third suspension plate 114 is suspended and supported in the vacuum cavity 204 by means of the third suspension beam 115, and the third suspension plate 114 is provided with an accommodation cavity 116 and multiple arrays 101 of HIN electrodes. Multiple arrays 101 of HIN electrodes are arranged at two opposite sides of the accommodation cavity 116 and spaced from each other. A fourth gap is formed between adjacent arrays 101 of HIN electrodes, and multiple arrays 101 of HIN electrodes constitute a stator of the electrostatic clutch 100.

Multiple arrays 102 of biased electrodes one-to-one correspond to and extend into the fourth gaps.

The capacitive sensing structure 300 includes fifth sensing moving electrodes 313 and fifth sensing static electrodes 314 accommodated in the accommodation cavity 116. Two ends of a plurality of fifth sensing moving electrodes 313 are fixed to a wall surface of the accommodation cavity 116. Each of the fifth sensing static electrode 314 is supported on the base plate 201 by means of a support. The fifth sensing static electrodes 314 and the fifth sensing moving electrodes 313 are separated spatially, and the fifth sensing static electrodes 314 and the fifth sensing moving electrodes 313 cross each other, to constitute a parallel plate capacitor structure, and a capacitance value changes by adjusting a distance between the fifth sensing static electrode and the fifth sensing moving electrode. This structure, has the advantage over the structure shown in FIG. 13, of having a higher sense capacitance.

When the membrane 203 vibrates, the electrostatic clutch 100 is activated to generate static electricity, and the clutch stator displaces due to AC displacement of the clutch rotor, thus a distance between the fifth sensing moving electrode 313 and the fifth sensing static electrode 314 changes, so that the capacitor structure can output variable electrical signals. A working principle of the capacitor structure is known to those skilled in the art.

Figure 16:
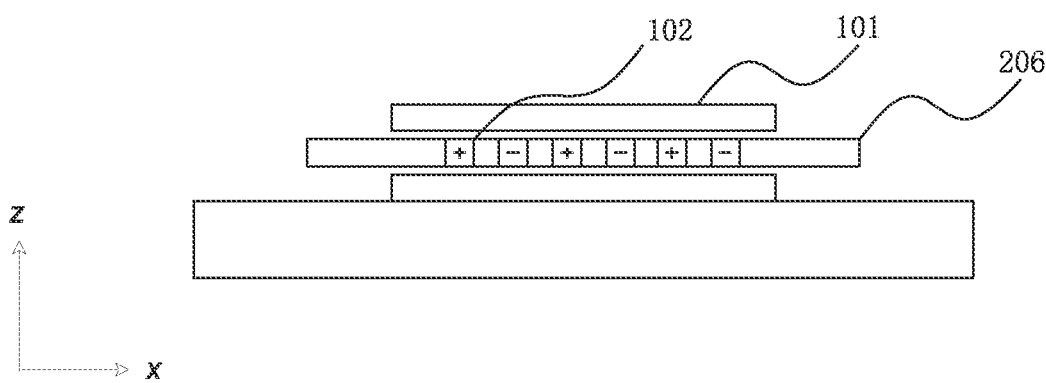
FIG. 16 is a schematic structural diagram of a seventh structure of a MEMS condenser microphone according to the present invention.
Figure 17:
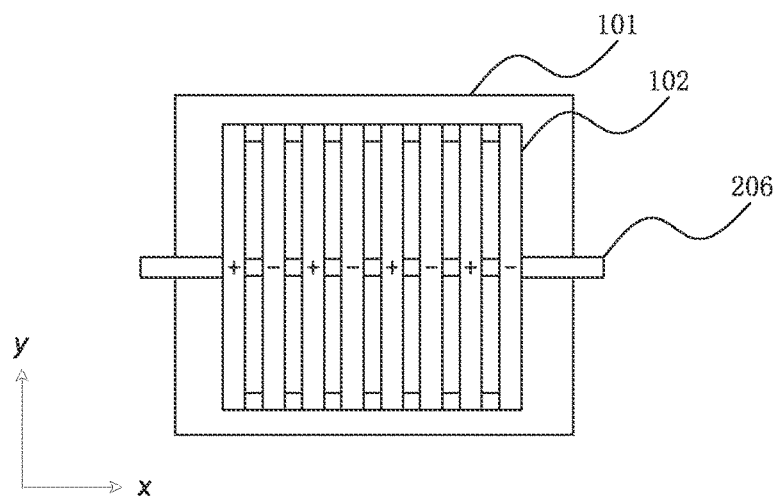
FIG. 17 is a top view of the seventh structure of a MEMS condenser microphone according to the present invention.

The above-described embodiments have all considered the comb-shaped design of the electrostatic clutch 100, where the array 102 of bias electrodes and the array 101 of HIN electrodes slide relative to each other in the z-axis while maintaining a fixed gap. In the following embodiment, the array 102 of bias electrodes moves relative to the array 101 of HIN electrode in an x-y plane with a fixed gap in the z-axis. With reference to FIG. 16 and FIG. 17, the array 102 of bias electrodes is connected to the support rod 206 which is in turn coupled to an atmosphere facing the membrane 203 via a structure that converts out of plane movement to in plane movement. The support rod 206 is disposed in the pass-through channel and moves back and forth along an arrangement direction of the biased electrodes 1021 in the respective pass-through channel. In this embodiment, several bias electrodes 1021 in the array 102 of bias electrodes are arranged in the x-axis direction, and the support rod 206 moves back and forth in the X-axis direction. This embodiment is suitable for converting deformation of the atmosphere facing the membrane 203 in the z-axis into the x-y plane. A length of the array 102 of bias electrodes and the array 101 of HIN electrodes in the x-direction is not limited by a process stacking height, allowing for a large array 102 of bias electrodes.

Figure 18:
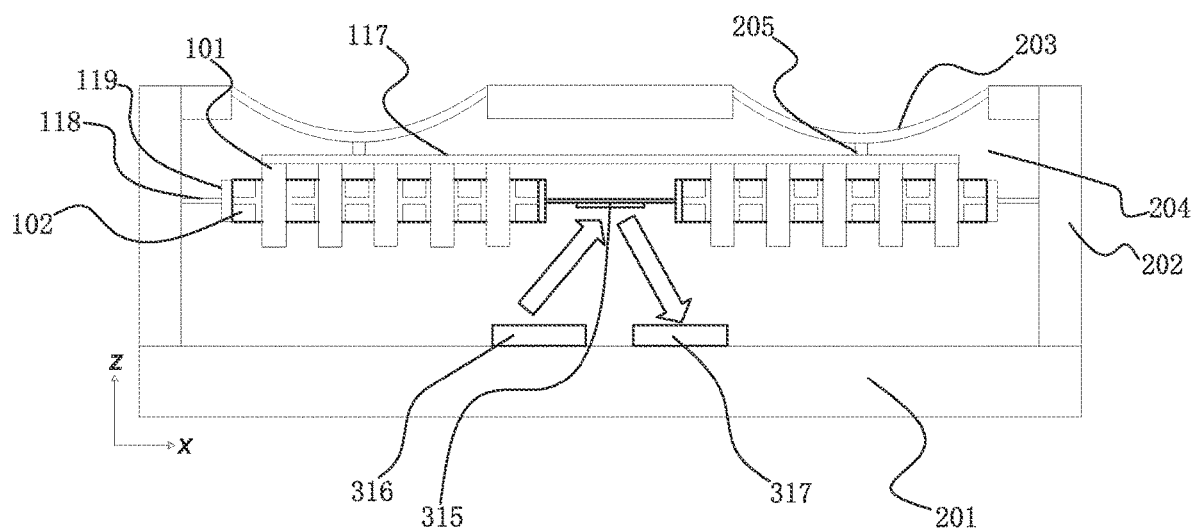
FIG. 18 is a schematic structural diagram of an eighth structure of a MEMS condenser microphone according to the present invention.

FIG. 18 illustrates an eighth structure of a MEMS condenser microphone 200. The electrostatic clutch 100 includes an eighth connecting part 117, a fourth suspension beam 118 and a fourth suspension plate 119.

The eighth connecting part 117 includes an end connected to the connecting rod 205, and another end connected to arrays 101 of high impedance nodes electrodes. The arrays 101 of high impedance nodes electrodes constitute a rotor of the electrostatic clutch 100. A displacement of the membrane 203 will cause a synchronous displacement of the array 101 of high impedance nodes.

Two sides of the fourth suspension plate 118 are suspended and supported in the vacuum cavity 204 through the fourth suspension beam 119, and arrays 102 of biased electrodes are arranged on the fourth suspension plate 118 at intervals. Fifth gaps and a sixth gap are respectively formed at the fourth suspension plate 118 at two opposite sides of the array 102 of biased electrodes, and biased electrodes 1021 constitute a stator of the electrostatic clutch 100.

The arrays 101 of high impedance nodes electrodes are in one-to-one correspondence with the fifth gaps, and extend into the fifth gaps, respectively.

The fifth gaps are evenly distributed at two opposite sides of the sixth gap. The sixth gap is provided therein with a light reflector 315. The base plate 201 is provided with a light emitter 316 and a light detector 317. The light emitter 316 can adopt a photodiode.

The light emitter 316 is configured to emit light, and the light is reflected into the light detector 317 by the light reflector 316 integrated into a stator part of the electrostatic clutch 100. By vibration of the membrane 203, electrostatic clutch 100 is activated, and electrostatic force is generated. Therefore, a displacement of the light reflector 316 occurs, and a calculation result output from the light detector 317 also changes. The light detector 317 typically outputs a voltage as a function of membrane displacement, where the function is typically a voltage oscillating between zero and a maximum voltage with a certain displacement period. The gradient of this repeating wave as a function of displacement equates to sensitivity in volts per m. For large DC displacements the membrane 203 will go through positions of zero sensitivity and maximum sensitivity. The use of an electrostatic clutch 100, allows the displacement being sensed to lie in a region of maximum sensitivity of the optical system regardless of the DC pressure.

The optical sensing system constituted by the light reflector 315, the light emitter 316 and the light detector 317 can have a higher sensitivity than capacitive sensing which reduces the requirements on the electrostatic clutch 100 and the membrane 203, such that a stiffer membrane 203 could be used and/or an electrostatic clutch 100 with smaller dimensions in the z-axis could be used, making fabrication by silicon processes easier.

The structure, features, and effects of the present invention are described in detail above based on the embodiments shown in the drawings. It should be noted that the above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. A MEMS condenser microphone, comprising a base plate, a spacer and a membrane, wherein the membrane is supported above the base plate by the spacer, and the base plate, the spacer, and the membrane enclose a vacuum cavity;

an end of the membrane close to the vacuum cavity is connected, by means of a connecting rod, to an electrostatic clutch; and the electrostatic clutch is connected to a capacitive sensing structure;

the electrostatic clutch comprises:

multiple arrays of high impedance nodes (HIN) electrodes, wherein a respective pass-through channel is formed between any two arrays of the multiple arrays of HIN electrodes; and multiple arrays of biased electrodes, wherein each array of the multiple arrays of biased electrodes moves back and forth in the respective pass-through channel, such that electrostatic force is generated between the multiple arrays of biased electrodes and the multiple arrays of HIN electrodes;

each array of the multiple arrays of HIN electrodes comprises a plurality of HIN electrodes and a grounded part, an insulating silicon oxide layer is provided between adjacent HIN electrodes of the plurality of HIN electrodes, and the grounded part is electrically connected to the plurality of HIN electrodes and to ground.

2. The MEMS condenser microphone as described in claim 1, wherein each of the plurality of HIN electrodes comprises a first conductive polysilicon layer, a resistive bridge layer, and a second conductive polysilicon layer; the first conductive polysilicon layer is electrically connected to the second conductive polysilicon layer through the resistive bridge layer; and the grounded part is electrically connected to the second conductive polysilicon layer of each of the plurality of HIN electrodes and to ground.

3. The MEMS condenser microphone as described in claim 1, wherein within each array of biased electrodes two adjacent biased electrodes of the plurality of biased electrodes have opposite polarities and are connected by an insulating mechanical support.

4. The MEMS condenser microphone as described in claim 3, wherein each array of biased electrodes further comprises two grounded shielding electrodes, which are arranged at two ends of each array of the multiple arrays of biased electrodes.

5. The MEMS condenser microphone as described in claim 1, wherein the electrostatic clutch further comprises: a first connecting part, and two second connecting parts symmetrically arranged at two opposite sides of the first connecting part;
the first connecting part comprises an end connected to the connecting rod, and another end connected to the multiple arrays of biased electrodes;
each of the two second connecting parts comprises an end connected to respective arrays of the multiple arrays of HIN electrodes, and another end connected to the capacitive sensing structure;
the multiple arrays of HIN electrodes and the multiple arrays of biased electrodes are arranged in a comb-like configuration, and the multiple arrays of HIN electrodes and the multiple arrays of biased electrodes are spatially separated and cross each other; and
the capacitive sensing structure comprises a first lever, a first supporting part, a first sensing moving electrode, and a first sensing static electrode; a rod body of the first lever is pivotally connected to the first supporting part through a hinge; the first lever comprises an end connected to the second connecting part, and another end connected to the first sensing moving electrode; and the first sensing static electrode is opposite to the first sensing moving electrode.

6. The MEMS condenser microphone as described in claim 5, wherein the electrostatic clutch further comprises: a third connecting part, and two fourth connecting parts symmetrically arranged at two opposite sides of the first connecting part;
the third connecting part comprises an end connected to the connecting rod, and another end connected to the multiple arrays of biased electrodes;
each of the two fourth connecting parts comprises a first end and a second end, and the first end of one of the two fourth connecting parts is opposite to the first end of the other one of the two fourth connecting parts; the multiple arrays of HIN electrodes are connected to and arranged between the first ends of the two fourth connecting parts; and the second ends of the two fourth connecting parts are connected to the capacitive sensing structure;
the multiple arrays of HIN electrodes and the multiple arrays of biased electrodes are arranged in a comb-like configuration, and the multiple arrays of HIN electrodes and the multiple arrays of biased electrodes are spatially separated and cross each other; and
the capacitive sensing structure comprises a second lever, a second supporting part, a bending slit, a second sensing moving electrode, and a second sensing static electrode; a rod body of the second lever is pivotally connected to the second supporting part through a hinge; the second lever comprises an end connected to the fourth connecting part, and another end connected to the second sensing moving electrode; the second sensing static electrode is opposite to the second sensing moving electrode; and the bending slit is located close to an end of the second lever close to the fourth connecting part.

7. The MEMS condenser microphone as described in claim 5, wherein the electrostatic clutch further comprises a fifth connecting part, a first suspension beam and a first suspension plate acting as both the stator part of the electrostatic clutch and rotor part of the capacitive sense structure;
the fifth connecting part comprises an end connected to the connecting rod, and another end connected to the multiple arrays of HIN electrodes;
two ends of the first suspension plate are suspended and supported in the vacuum cavity by means of the first suspension beam, the multiple arrays of biased electrodes are arranged on the first suspension plate and spaced from each other; first gaps and second gaps are formed in the first suspension plate at two opposite sides of the multiple arrays of biased electrodes;
the multiple arrays of HIN electrodes one-to-one correspond to and extend into the first gaps; and
the capacitive sensing structure comprises third sensing static electrodes arranged on the base plate and spaced from each other, and the third sensing static electrodes one-to-one correspond to and extend into the second gaps.

8. The MEMS condenser microphone as described in claim 7, wherein each of the third sensing static electrodes comprises a first portion and a second portion, the first portion extends into a respective one of the second gaps, and the second portion protrudes from the respective one of the second gaps to extend along a length direction of the first suspension plate.

9. The MEMS condenser microphone as described in claim 4, wherein the electrostatic clutch further comprises a sixth connecting part, a second suspension beam, and a second suspension plate;
the sixth connecting part comprises an end connected to the connecting rod, and another end connected to the multiple arrays of biased electrodes;
two ends of the second suspension plate are suspended and supported in the vacuum cavity by means of the second suspension beam, the multiple arrays of HIN electrodes are arranged on the second suspension plate and spaced from each other, and a respective one of third gaps is formed between any two adjacent arrays of the multiple arrays of HIN electrodes;
the multiple arrays of biased electrodes one-to-one correspond to and extend into the third gaps; and the capacitive sensing structure comprises fourth sensing moving electrodes and fourth sensing static electrodes, the fourth sensing moving electrodes are fixed to a bottom of the suspension plate, the fourth sensing static electrodes are arranged on the base plate and spaced from each other, and the fourth sensing static electrodes are opposite to the fourth sensing moving electrodes.

10. The MEMS condenser microphone as described in claim 5, wherein the electrostatic clutch comprises a seventh connecting part, a third suspension beam and a third suspension plate;
the seventh connecting part comprises an end connected to the connecting rod, and another end connected to the multiple arrays of biased electrodes;
two ends of the third suspension plate are suspended and supported in the vacuum cavity by means of the third suspension beam; the third suspension plate is provided with an accommodation cavity and the multiple arrays of HIN electrodes; the multiple arrays of HIN electrodes are arranged two opposite sides of the accommodation cavity; and a respective one of fourth gaps is formed between any two adjacent arrays of the multiple arrays of HIN electrodes;
the multiple arrays of biased electrodes one-to-one correspond to and extend into the fourth gaps; and
the capacitive sensing structure comprises fifth sensing moving electrodes and fifth sensing static electrodes accommodated in the accommodation cavity; two ends of the fifth sensing moving electrodes are fixed to a wall surface of the accommodation cavity moving synchronously with the third suspension plate; the fourth sensing static electrodes are supported on the base plate by means of a support; the fourth sensing static electrodes and the fourth sensing moving electrodes are spatially separated and cross each other.

11. The MEMS condenser microphone as described in claim 3, wherein each array of biased electrodes is connected to the membrane, the membrane is disposed in the pass-through channel and moves back and forth along an arrangement direction of the biased electrodes in the respective pass-through channel.

12. The MEMS condenser microphone as described in claim 3, wherein the electrostatic clutch comprises an eighth connecting part, a fourth suspension beam and a fourth suspension plate,
wherein the eighth connecting part comprises an end connected to the connecting rod, and another end connected to arrays of high impedance nodes electrodes,
wherein two sides of the fourth suspension plate are suspended and supported in the vacuum cavity through the fourth suspension beam, arrays of biased electrodes are arranged at the fourth suspension plate at intervals, and fifth gaps and a sixth gap are respectively formed at the fourth suspension plate at two opposite sides of the array of biased electrodes,
wherein the arrays of high impedance nodes electrodes are in one-to-one correspondence with the fifth gaps, and extend into the fifth gaps, respectively,
wherein the fifth gaps are evenly distributed at two opposite sides of the sixth gap, and
wherein the sixth gap is provided therein with a light reflector, and the base plate is provided with a light emitter and a light detector.

* * * * *